United States Patent Office 3,790,592
Patented Feb. 5, 1974

3,790,592
1-SUBSTITUTED-5-NITROIMIDAZOL-2-YLALKYL-
(N-SUBSTITUTED)-CARBAMATES
John A. Carlson, Mead Road, R.F.D. 2, Nassau, N.Y.
12123; Dale R. Hoff, 2 Kings Ridge Road, R.F.D. 1,
Basking Ridge, N.J. 07920; and Clarence S. Rooney,
416 Fletchers Road, Beaconsfield, Quebec, Canada
No Drawing. Application Sept. 5, 1969, Ser. No. 855,769,
now Patent No. 3,646,027, dated Feb. 29, 1972, which
is a continuation-in-part of application Ser. No. 550,932,
May 18, 1966, which in turn is a continuation-in-part
of application Ser. No. 470,239, July 7, 1965, both now
abandoned. Divided and this application Nov. 12, 1971,
Ser. No. 198,432
Int. Cl. C07d 49/36
U.S. Cl. 260—309     8 Claims

ABSTRACT OF THE DISCLOSURE 1-substituted-5-nitroimidazol-2-ylalkyl carbamates containing N-alkoxy, alkanoyloxy, or benzoyloxy substituents, and acid addition salts thereof are prepared from 1-substituted-5-nitroimidazoles having at the 2-position of the imidazole ring a hydroxyalkyl, mercaptoalkyl, haloalkyl, halocarbonylalkyl or halothiocarbonyloxyalkyl radical. The 1-substituted - 5 - nitroimidazol-2-ylalkyl-(N-substituted)-carbamates are useful in the treatment of parasitic diseases. Antiparasitic compositions in which the active ingredient is a 1-substituted-imidazol-2-ylalkyl-(N-substituted)-carbamate are also provided.

CROSS REFERENCE TO RELATED APPLICATIONS

This application is a divisional application of our copending application U.S. Ser. No. 855,765, filed Sept. 5, 1969, now U.S. Pat. 3,646,027, which in turn was a continuation-in-part application of copending application U.S. Ser. No. 550,932, filed May 18, 1966, now abandoned, which in turn, was a continuation-in-part application of U.S. Ser. No. 470,239, filed July 7, 1965, and now abandoned.

DESCRIPTION OF THE PREFERRED EMBODIMENTS

This invention relates to new chemical compounds. More particularly, it relates to novel imidazole carbamates. It is concerned further with chemical synthesis of such substances and with novel imidazole compounds useful as intermediates in such synthesis. In addition, it is concerned with antiparasitic compositions containing the imidazole carbamates of this invention as active ingredients.

One object of this invention is to provide new and useful 1-substituted-imidazol-2-ylalkyl, N-substituted carbamates and acid addition salts thereof. It is also an object to provide 1-substituted-5-nitroimidazol-2-ylalkyl-(N - substituted) - carbamates which have antiparasitic activity. Another object is to provide methods for making these compounds from 1-substituted - 5 - nitroimidazoles having at the 2-position of the imidazole ring, a hydroxyalkyl, mercaptoalkyl, haloalkyl, halocarbonyloxyalkyl, or halothiocarbonyloxyalkyl radical.

A further object is to provide compositions useful against parasitic diseases, for example, trichomoniasis, enterohepatitis and as antihelminthic compositions against ascarids and schistosomes. Certain of them are also effective against amoebiasis and trypanosomiasis as well as chronic respiratory diseases in fowl and swine caused by PPLO organisms. Certain of the compositions of the present invention also show antibacterial activity. In these compositions, 1 - substituted-5-nitroimidazol-2-ylalkyl-(N-substituted)-carbamates are present as active ingredients.

The novel imidazole carbamates of this invention may be represented by the following structural formulae:

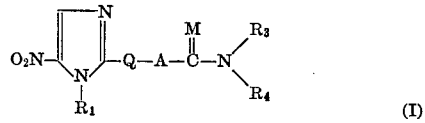

(I)

in which $R_1$ is loweralkyl having 1–5 carbon atoms; Q is loweralkylene or loweralkylidene having 1–4 carbon atoms; A and M are each oxygen or sulfur; $R_3$ is hydrogen or loweralkyl having 1–3 carbon atoms; and $R_4$ is substituted hydroxy wherein the substituents are acyl, such as alkanoyl, suitably loweralkanoyl having 1–5 carbon atoms, such as, formyl, acetyl, propionyl, butyryl, or valeryl, aralkanoyl, suitably phenylloweralkanoyl, such as, phenylacetyl; cyanoalkanoyl, suitably cyanoloweralkanoyl, such as cyanoacetyl or cyanopropionyl; alkenoyl, suitably loweralkenoyl, such as acryloyl or crotonyl; and aroyl, such as benzoyl; alkyl, suitably loweralkyl having 1–5 carbon atoms, for example, methyl, ethyl, butyl and pentyl; aralkyl, such as phenylloweralkyl, suitably benzyl and aryl, for example, phenyl.

Also within the purview of the invention are acid addition salts of these imidazole carbamates. The salt may be of an inorganic acid such as the hydrochloride, hydrobromide, phosphate, nitrate or sulfate, or of an organic acid, examples of which are the citrate, tartrate, adipate, methanesulfonate, p-toluenesulfonate and the like. Non-toxic acid addition salts, i.e., those tolerated by the host at the dose levels employed, are employed when the carbamates are to be used in their salt form as antiparasitic agents.

The preferred compounds of this invention are the 1-substituted-5-nitroimidazol-2-ylalkyl N-loweralkoxy, loweralkanoyloxy, or benzoyloxy carbamates. More specifically, the preferred compounds are the imidazolylalkyl carbamates of the invention as shown in Formula I supra, wherein Q is loweralkylene suitably methylene or ethylene, or loweralkylidene suitably 1-ethylidene, $R_1$ is alkyl such as methyl or ethyl and the subgroup

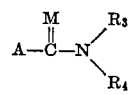

wherein A is oxygen or sulfur, M is oxygen or sulfur and $R_3$ is hydrogen or loweralkyl and $R_4$ is loweralkoxy, loweralkanoyloxy, or benzoyloxy. These preferred embodiments will be discussed at more length than others in the description of the invention. The following explanations of processes apply to most substances embraced by the generic Formula I.

In accordance with the present invention, there are provided chemical syntheses of these novel imidazolylalkyl carbamates.

THE GENERAL PROCESSES

(i) The imidazole halocarbonate process

One process for making the carbamates of this invention consists in reaction of the halocarbonate or halothiocarbonate ester of 1-substituted-2-hydroxyalkyl-(or 2-mercaptoalkyl)-5-nitroimidazole with a primary or secondary amine. The reaction may be schematically represented as follows:

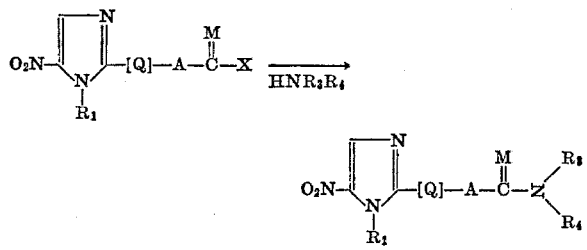

wherein Q, A, M, $R_1$, $R_3$, and $R_4$ are as above, and X is halo.

In the preferred modification of this process, the significance of the substituents is as follows:

Q is loweralkylene suitably methylene or ethylene; or loweralkylidene suitably ethylidene;
$R_1$ is loweralkyl suitably methyl, ethyl or propyl;
A and M each represent oxygen or sulfur;
X is chloro;
$R_3$ is hydrogen or loweralkyl; and $R_4$ is hydroxy.

The two reactants are contacted in a suitable inert solvent medium such as dioxane, tetrahydrofuran or an aromatic hydrocarbon, such as benzene, at a temperature in the range of about 0–75° C. An excess of amine reactant is generally employed and good results are obtained with from about 2.0–5.0 moles of amine per mole of halocarbonate ester, such as chlorocarbonate ester, at reaction temperature of from about 10–40° C. for most amines. It might be noted that the ester reactants are frequently referred to by those in this art as the haloformate (or halothionformate) esters of the 1-substituted-2-hydroxyalkyl (or mercaptoalkyl)-5-nitroimidazole.

The molar excess of amine is desired since it is convenient and customary to use 1 mole of the amine (in addition to the mole needed for the reaction itself) as an acid binding agent to neutralize the acid formed in the reaction. The reactants are more commonly termed "hydrazines." The haloformate ester starting material may be charged to the reaction in the form of an acid addition salt, and it is then necessary to have another mole of amine to neutralize this salt.

Amines which are suitable for use in this reaction include hydroxylamine, N-methylhydroxylamine, N-ethylhydroxylamine, and the like.

(ii) Preparation of imidazole halocarbonate

The imidazole chlorocarbonate or chlorothioncarbonate ester used in the above process is obtained by reacting phosgene or thiophosgene at a temperature of between about −10° C. and room temperature with an imidazole of the structure

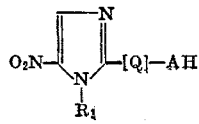

where Q, A, and $R_1$ are as above. Generally the lower temperatures are used with phosgene, and higher temperatures with thiophosgene. The process is conducted in an inert organic solvent medium. Satisfactory solvents are dioxane, tetrahydrofuran and toluene, or mixtures thereof, as well as ketones and esters such as ethyl acetate. It is desirable to employ a solvent in which the imidazole reactant is essentially completely soluble. For best results, the process is conducted in the presence of an acid binding agent, normally a tertiary amine such as trialkylamine or dimethylaniline, although solvents such as tetrahydrofuran and dioxane may themselves be used as acid binding agents in this reaction. The chloroformate or chlorothionformate ester may be isolated, if desired, but this is unnecessary, and it is a preferred embodiment of the invention to prepare the ester in solution and to react it without isolation with the amine.

(iii) 5-nitroimidazol-2-ylalkyl N-alkoxycarbamates 5-nitroimidazol-2-ylalkyl N-alkoxycarbamates may be prepared by reacting the corresponding 5-nitroimidazole N-hydroxycarbamate with a diazo hydrocarbon. In the preferred procedure, the 5-nitroimidazole N-hydroxycarbamate, sutably a 1-$R_1$-5-nitroimidazol-2-yl-methyl-N-hydroxycarbamate, wherein $R_1$ is as shown above, for example, 1-methyl - 5 - nitroimidazol-2-ylmethyl-N-hydroxycarbamate is dissolved in an alkanol, for example, methanol or ethanol and treated with an excess of diazo hydrocarbon, suitably in solution, for example, an ethereal solution of diazomethane, diazoethane or diazophenylmethane. The product may be isolated in the form of an acid salt. In one suitable method of isolation, the reaction mixture is filtered, the residue chromatographed on silica gel and the residue, after evaporation of the eluate, treated with one equivalent of a solution of acid, suitably p-toluenesulfonic acid in methylethylketone.

Included among the products which may be obtained by this procedure are:

1-methyl-5-nitroimidazol-2-ylmethyl N-methoxycarbamate;
1-methyl-5-nitroimidazol-2-ylmethyl N-methyl-N-methoxycarbamate; and
1-ethyl-5-nitroimidazol-2-ylmethyl N-ethoxycarbamate.

(iv) Acylation of 5-nitroimidazol-2-ylalkyl N-hydroxycarbamates 5-nitroimidazol - 2 - ylalkyl N-hydroxycarbamates may be acylated in the usual manner. In the preferred procedure, the compound to be acylated, for example a 1-$R_1$-5-nitroimidazol-2-ylmethyl carbamate wherein $R_1$ is as defined above, is reacted with an acylating agent such as an alkanoyl anhydride, suitably a loweralkanoyl anhydride, such as acetic anhydride, propionic anhydride or valeric anhydride; an alkanoyl halide, such as acetyl chloride or propionyl chloride; an aroyl halide, such as benzoyl halide; an alkenoyl halide suitably a loweralkenoyl halide, such as acryloyl chloride or crotonyl chloride or a cyano alkanoic acid in the presence of a dehydrating agent, for example, cyano acetic acid in the presence of acetic anhydride.

The product of the acylation reaction may be isolated by any of the usual procedures.

(v) The phenyl halocarbonate method

Still another process which is very useful for preparing the novel imidazolylalkyl carbamates described herein comprises the conversion of a 1-substituted-2-hydroxyalkyl (or mercaptoalkyl) imidazole to a phenyl carbonate or phenyl thiocarbonate derivative, and subsequent treatment of said carbonate or thioncarbonate with an amine, as illustrated below:

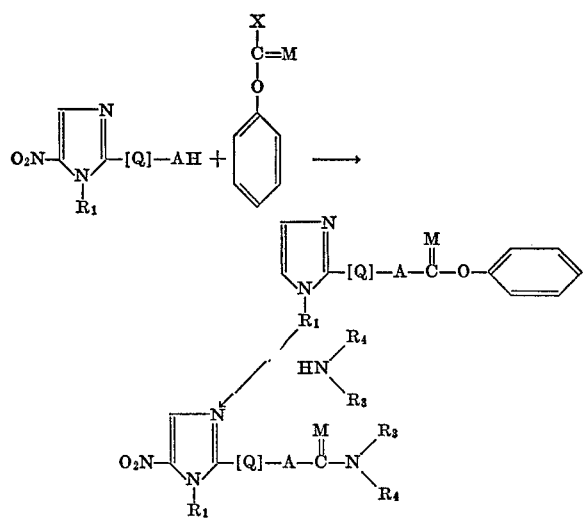

wherein Q, R$_1$, R$_3$, R$_4$, A and M are as above and X is halo.

This process for making imidazolylalkyl carbamates, which process is itself not a part of this invention, but is rather an invention of our colleague George Gal, is highly satisfactory for obtaining carbamates. This process is described more fully in U.S. Pat. 3,458,528, issued July 29, 1969.

In the preferred modification of this process, the significance of the substituents is as follows:

Q is loweralkylene suitably methylene or ethylene; or loweralkylidene suitably 1-ethylidene;

R$_1$ is loweralkyl suitably methyl, ethyl, or propyl;

A and M each represent oxygen or sulfur;

R$_3$ is hydrogen or loweralkyl; and R$_4$ is hydroxy.

In carrying out this process, a 1-loweralkyl-2-hydroxyalkyl (or mercaptoalkyl)-5-nitroimidazole such as 1-methyl-2-hydroxyalkyl (or mercaptoalkyl) - 5 - nitroimidazole such as is first reacted for example with phenoxy carbonyl chloride (phenyl chloroformate) or phenoxythiocarbonyl chloride (phenyl thionchloroformate). This reaction is conveniently brought about in an organic solvent, such as pyridine, one of the picolines, or lutidine. These bases, in addition to serving as the liquid solvent medium, also serve to bind the acid formed during the reaction. Alternatively, a non-basic solvent for the reactants such as dioxane or chloroform may be employed, and sufficient tertiary amine or alkali metal hydroxide added to bind the liberated hydrogen chloride. It is preferred to employ a slight molar excess of phenyl chloroformate reactant and to carry out the process at temperatures of from about —5° C. to about 45° C. Preferably, the reactants are mixed at about 0° C. and the reaction then continued at about room temperature for the desired time. When a phenyl carbonate of a 2-hydroxymethyl or 2-mercaptomethyl is being prepared, reaction times of from about 1–5 hours are satisfactory for good results. However, longer times of up to about 30 hours may be necessary for complete reaction in the case of 2-(α-hydroxyethyl) and 2-(α-mercaptoethyl)imidazoles. The resulting imidazole phenyl carbonate, such as for instance 1-methyl-5-nitromidazol-2-ylmethyl phenyl carbonate or 1-methyl-5-nitroimidazol-2-ylmethyl phenyl thioncarbonate is conveniently recovered by quenching the reaction mixture in ice water, thus precipitating the desired product. These substances may be used without further purification in the next step of the process, and this is preferred in the case of the phenyl thioncarbonates which are less stable than the phenyl carbonates.

The imidazolylalkyl carbamate is then obtained by intimately contacting the imidazole phenyl carbonate or phenyl thioncarbonate with an amine in an inert organic solvent medium. For this purpose, chloroform or ethers such as dioxane, tetrahydrofuran or ethylene glycol dimethyl ether are satisfactory. It will, of course, be understood that the particular carbamate produced will depend upon the amine reactant used. The reaction is a rapid one and is normally substantially complete in about 1–5 hours. The imidazole phenyl carbonate and the amine may be reacted in essentially equimolar amounts although it is preferred to employ an excess of the amine. Good results are obtained by using from 1.0–4 moles of amine per mole of phenyl carbonate. The N-hydroxyl compound is then alkylated or acylated as described supra.

The 1-substituted-2-imidazolylalkyl - (N - substituted)-carbamates above have antiprotozoal activity, and are particularly active against the causative organisms of the protozoal parasitic diseases trichomoniasis and enterohepatitis. Certain of them are also effective against amoebiasis and trypanosomiasis, as well as against the PPLO organisms and schistosomes. It will, of course, be understood that the compounds differ in their degree of efficacy against these various organisms.

Trichomoniasis is a protozoan disease caused by parasites of the genus Trichomonas. The compounds of the invention are effective against the particularly troublesome form of trichomoniasis known as *T. vaginalis* caused by infestation of the vagina with *T. vaginalis*. In treating this disease, the imidazolylalkyl carbamates may be administered either orally or topically. For oral administration unit dosage, forms such as tablets or capsules are normally employed which may contain from about 50 to about 500 mg. of active ingredient. These are prepared by techniques known in the art, and contain the usual diluents, granulating agents, extenders and/or lubricating agents known to be satisfactory for the compounding of tablets and capsules. It is preferred to administer the compounds of the invention orally at a dose level of from about 25–1,000 mg./day, in either single or divided doses with divided doses being used more frequently than a single daily dose. An example of a suitable compressed tablet is the following:

| Component: | Mg. per tablet |
|---|---|
| 1-methyl-5-nitroimidazol-2-ylmethyl N-methoxy carbamate | 250 |
| Dicalcium phosphate | 100 |
| Lactose | 75 |
| Starch | 50 |
| Guar gum | 12 |
| Magnesium stearate | 2–3 |

If desired, tablets may be sugar coated or enteric coated by standard techniques. Alternatively, the antitrichomonal agent may be formulated in capsule form using fillers such as lactose, starch or kaoline. A typical capsule would contain 250 mg. of, for instance, 1-methyl-5-nitroimidazol-2-ylmethyl N-acetoxymethyl carbamate, 2–3 g. of magnesium stearate and about 75 mg. of lactose in a No. 0 size capsule. Tablets and capsules containing smaller quantities of active ingredient may be made by reducing proportionately the amounts of excipients and diluents illustrated above. Alternatively, the carbamates may be administered orally in liquid pharmaceutical vehicles such as solutions, emulsions, syrups or suspensions containing the diluents, flavoring agents and preservatives customarily employed in the pharmaceutical art.

For topical application, vaginal creams or suppositories containing the active ingredient may be used. To illustrate, a cream is prepared by mixing sufficient quantities of hydrophilic ointment and water, containing from about 5–10% by weight of carbamate, in sufficient quantities to produce a cream having the desired consistency.

Enterohepatitis is a disease occurring primarily in turkeys and is caused by the protozoan parasite *Histomonas meleagridis*. It is also known as turkey blackhead disease.

The imidazolylalkyl carbamates of this invention are useful in the prevention and treatment of this disease and for this purpose are administered to turkeys mixed with an element of turkey sustenance, i.e. in the feed or drinking water. Although the optimum dose level will depend on the particular compound employed and the severity of the infection, good control of enterohepatitis is obtained by orally administering to the turkeys a feed containing from about 0.003% to about 0.1% by weight of carbamate. When the material is administered via the drinking water, somewhat higher levels may be employed, especially for therapeutic use. For instance, the drinking water may contain up to about 0.2% by weight of the active ingredient with good results. Those substances previously mentioned as preferred anti-trichomonal agents are also among those preferred in combating turkey blackhead.

As previously stated, the imidazolylalkyl carbamate described herein may also be employed against trypanosomiasis and amoebiasis. In addition, certain of them, and particularly 1-methyl-5-nitroimidazol-2-ylmethyl N - methoxycarbamate, 1-methyl-5-nitroimidazol-2-ylmethyl N-acetoxycarbamate, and 1-ethyl-5-nitroimidazol-2-ylmethyl N-benzoyloxy carbamate, possess activity against the pleuropneumonia like organisms which have come to be known as PPLO organisms.

The imidazolylalkyl carbamates are effective against PPLO organisms when the compound is administered to fowl or swine in feed containing from about 0.003% to about 0.1% by weight of carbamate. The preferred dosage level, however, is between from about 0.003% to 0.08% by weight.

The following examples are given for the purpose of illustration and not by way of limitation.

In addition, preparation of the starting materials can be found in U.S. Pat. 3,458,528 or Belgium Pat. 683,796 issued Jan. 9, 1967, an equivalent of the disclosure in U.S. Ser. No. 550,932 filed May 18, 1966, a parent application of the instant application.

EXAMPLE 1

1-methyl-5-nitroimidazol-2-yl-methyl chloroformate 3.12 g. 1-methyl-2-hydroxymethyl-5-nitroimidazole is dissolved in a mixture of 4.3 ml. of dimethylaniline and 20 ml. of dioxane. This solution is then added dropwise to 30 ml. of phosgene. The resulting suspension is stirred for two hours at 0–5° C., and then for two hours at room temperature. The solvent is then removed by blowing dry nitrogen through the suspension for two hours. The oil remaining at the end of this time consists predominantly of 1-methyl-5-nitroimidazol-2-ylmethyl chloroformate.

In accordance with the above procedure, but starting with 1-methyl-2-mercaptomethyl - 5 - nitroimidazole, in place of 1-methyl-2 - hydroxymethyl - 5 - nitroimidazole, there is obtained 1-methyl-5-nitroimidazol-2 - yl - methyl chlorothioformate.

In accordance with the above procedure and starting with either of the aforementioned nitroimidazoles but using thiophosgene in place of phosgene, there is obtained 1-methyl-5-nitroimidazol-2-yl - methyl chlorothioformate and 1-methyl-5-nitroimidazol-2-yl - methyl chlorodithioformate.

EXAMPLE 2

1-methyl-5-nitroimidazol-2-ylmethyl carbamate 0.05 g. of 1-methyl-5-nitroimidazol-2-ylmethyl phenyl carbonate is dissolved slowly in 50 ml. of liquid ammonia. After solution is complete, the ammonia is permitted to evaporate and the residue washed with ethanol and recrystallized from methanol to yield 1 - methyl - 5 - nitroimidazol-2-ylmethyl carbamate: M.P. 166–170° C.

In accordance with the above procedure, but starting with 1-(1-methyl-5-nitroimidazol-2-yl)-ethyl phenyl carbonate, 2 - (1-methyl-5-nitroimidazol-2-yl)-ethyl phenyl carbonate and 3-(1-methyl-5-nitroimidazol-2-yl)-prop-2-1-yl phenyl carbonate in place of 1-methyl-5-nitroimidazol-2-yl-methyl phenyl carbonate there is obtained the corresponding 1-(1-methyl-5-nitroimidazol-2-yl)ethyl carbamate, 2-(1-methyl-5-nitroimidazol-2-yl)ethyl carbamate, and 3-(1-methyl-5-nitroimidazol-2-yl)prop-2-enyl carbamate.

EXAMPLE 3

1-methyl-5-nitroimidazol-2-ylmethyl carbamate 3.12 g. of 1-methyl-2-hydroxymethyl-5-nitroimidazole is dissolved in 100 ml. of methylene dichloride and cooled to 0° C. 2.64 g. of sodium cyanate and 4.5 g. of trifluoroacetic acid are added. The flask is stoppered tightly and the mixture stirred for 24 hours at 0° C. 200 ml. of methylene chloride is then added and the mixture washed with saturated aqueous potassium bicarbonate solution. The methylene chloride solution is concentrated to dryness in vacuo to give a residue of 1-methyl-5-nitro-2-imidazolylmethyl carbamate. This solid is recrystallized from a minimum volume of ethyl acetate to give substantially pure 1-methyl-5-nitroimidazol-2-ylmethyl carbamate; M.P. 166–170° C.

EXAMPLE 4

1-methyl-5-nitroimidazol-2-ylmethyl thiolcarbamate 1.35 g. of 1-methyl-2-chloromethyl-5-nitroimidazole is dissolved in 25 ml. of dry ethanol at room temperature, and 1.11 g. of potassium thiocyanate is added to this solution. The resulting mixture is refluxed for two hours and then allowed to stand at room temperature for about 12 hours. It is warmed to about 75° C. on a steam bath and the solid material removed by filtration. The filtrate is diluted with an equal volume of water and the resulting solution chilled and scratched to induce crystallization. The solid which forms is removed by filtration, washed with ice-water and dried. It is 1-methyl-2-thiocyanomethyl-5-nitroimidazole; M.P. 87–88° C. This product is crystallized from a minimum volume of benzene containing a trace of hexane to give yellow crystals of 1-methyl-2-thiocyanomethyl-5-nitroimidazole; M.P. 87.5–88° C.

5 g. of 1-methyl-2-thiocyanomethyl-5-nitroimidazole is added portionwise over a period of 15 minutes to 25 ml. of cold concentrated sulfuric acid. The resulting solution is held at 0° C. for about 14 hours and then poured onto an excess of crushed ice. The solution is adjusted to pH 6 with saturated potassium bicarbonate solution. The solid material is removed by filtration and washed with ice-water. The solid is extracted with about 10 ml. of ethyl acetate and the ethyl acetate solution dried over sodium sulfate and then concentrated essentially to dryness. A small volume of hexane is added to the residue and the solid 1-methyl-5-nitro-2-imidazolylmethyl thiolcarbamate removed by filtration. There are obtained in this way 4.34 g. of 1-methyl-5-nitroimidazol-2-ylmethyl thiolcarbamate; M.P. 138–140° C.

EXAMPLE 5

1-methyl-5-nitroimidazol-2-ylmethyl carbamate 1-methyl-5-nitroimidazol-2-ylmethyl chloroformate as obtained in accordance with Example 1 is cooled to 0° C. and 25 ml. of liquid ammonia added thereto. The resulting mixture is stirred for 10 minutes in the cold and then an additional 25 ml. of liquid ammonia is added. The mixture is then allowed to warm to room temperature and stirred until the excess ammonia evaporates. The residue thus obtained is dissolved in 100 ml. of water and the aqueous solution extracted with three 100 ml. portions of ethyl acetate. The ethyl acetate extracts are combined, backwashed with 25 ml. of water and then dried over sodium sulfate. The ethyl acetate is then concentrated to dryness in vacuo to give a residue consisting of 1-methyl-5-nitroimidazol-2-ylmethyl carbamate. The product is recrystallized from ethyl acetate and then from water to give substantially pure material; M.P. 172–173° C.

In accordance with the above procedure but starting with 1-methyl-5-nitroimidazol-2-ylmethyl chlorothiolformate, 1 - methyl-5-nitroimidazol-2-ylmethyl chlorothionformate, 1 - methyl-5-nitroimidazol-2-ylmethyl chlorodithioformate in place of 1 - methyl-5-nitroimidazol-2-ylmethyl chloroformate, there is obtained the corresponding 1 - methyl-5-nitroimidazol-2-ylmethyl thiolcarbamate, 1-methyl-5-nitroimidazol-2-ylmethyl thioncarbamate, and 1-methyl-5-nitroimidazol-2-ylmethyl dithiocarbamate.

EXAMPLE 6

1-methyl-5-nitroimidazol-2-ylmethyl carbamate 3.1 g. (0.02 mole) of (1-methyl-2-hydroxymethyl)-5-nitroimidazole is dissolved in 100 ml. of benzene and 25 ml. of pyridine. 1.9 g. (0.022 mole) of gaseous carbamyl chloride is introduced into the stirred solution. The solution is allowed to stand at 15° C. for 8 hours and then concentrated under reduced pressure. The residue is taken up in ethyl acetate, washed with ice-water, and the ethyl acetate extract dried over sodium sulfate. On evaporation of the solvent under reduced pressure, the residue is recrystallized from acetone or ethyl acetate to yield 1 - methyl - 5-nitroimidazol-2-ylmethyl carbamate; M.P. 166–170° C.

In accordance with the above procedure but using dimethylcarbamyl chloride or diethylcarbamyl chloride and adding these reagents in liquid rather than gaseous form to the reaction mixture in place of using carbamyl chloride, there is obtained the corresponding 1-methyl-5-nitroimidazol-2-ylmethyl N,N-dimethylcarbamate and 1-methyl-5-nitroimidazol-2-ylmethyl N,N-diethylcarbamate.

In accordance with the above procedure but using thiocarbamoyl chloride, dimethylthiocarbamoyl chloride, and diethylcarbamoyl chloride, in place of carbamoyl chloride, there is obtained 1-methyl-5-nitroimidazol-2-yl-methyl thioncarbamate, 1-methyl-5-nitroimidazol-2-yl-methyl N,N-dimethylthioncarbamate, and 1-methyl-5-nitroimidazol-2-ylmethyl N,N-diethylthioncarbamate.

EXAMPLE 7

1-methyl-5-nitroimidazol-2-ylmethyl thiolcarbamate 3.5 g. (.02 mole) of 1-methyl-2-mercapto methyl-5-nitroimidazole is dissolved in 100 ml. of benzene and 25 ml. of pyridine under nitrogen. 1.9 g. (0.022 mole) of gaseous carbamoyl chloride is introduced into the stirred solution. The solution is allowed to stand at 15° C. for 8 hours and then concentrated under reduced pressure. The residue is taken up in ethyl acetate, washed with ice-water and the ethyl acetate extract dried over sodium sulfate. On evaporation of the solvent under reduced pressure, the residue is recrystallized from acetone or ethyl acetate to yield 1-methyl-5-nitroimidazol-2-ylmethyl thiolcarbamate; M.P. 138–140° C.

In accordance with the above procedure but using dimethylcarbamoyl chloride or diethylcarbamoyl chloride and adding these reagents in liquid rather than gaseous form to the reaction mixture in place of carbamoyl chloride, there is obtained the corresponding 1-methyl-5-nitroimidazol-2-ylmethyl N,N - dimethylthiolcarbamate and 1-methyl-5-nitroimidazol-2-ylmethyl N,N-diethylthiolcarbamate.

In accordance with the above procedure but using thiocarbamoyl chloride and dimethylthiocarbamoyl chloride and diethylcarbamoyl chloride, in place of carbamoyl chloride, there is obtained 1-methyl-5-nitroimidazol-2-ylmethyl dithiocarbamate, 1-methyl-5-nitroimidazol-2-ylmethyl N,N-dimethyldithiocarbamate, and 1-methyl-5-nitroimidazol-2-ylmethyl N,N-diethyldithiocarbamate.

EXAMPLE 8

1-methyl-5-nitroimidazol-2-ylmethyl carbamate 1.57 g. (0.01 mole) of 1-methyl-2-hydroxymethyl-5-nitroimidazole, 0.1 g. sodium ethoxide, 10 g. of ethyl carbamate, and 20 ml. of benzene are heated under reflux for 2 hours. The solvent is removed under reduced pressure and the residue stirred with 10 ml. of water. The mixture is extracted with ethyl acetate. The ethyl acetate fraction is dried over sodium sulfate and evaporated to give crude 1-methyl-5-nitroimidazol-2-ylmethyl carbamate.

In accordance with the above procedure but starting with 1-methyl-2-mercaptomethyl - 5 - nitroimidazole, in place of 1-methyl-2-hydroxy methyl-5-nitroimidazole and using ethyl carbamate, there is obtained the corresponding 1-methyl-5-nitroimidazol-2-ylmethyl thiolcarbamate.

EXAMPLE 9

1-methyl-5-nitroimidazol-2-ylmethyl methylcarbamate 6 g. of 1-methyl-2-hydroxymethyl-5-nitroimidazole and 3.5 ml. of methyl isocyanate are added to 200 ml. of benzene containing 0.5 ml. of pyridine. The resulting mixture is refluxed until complete solution is obtained. The solvent is then removed by evaporation under reduced pressure. The partially crystalline material thus obtained is recrystallized from 12 ml. of water to give 1.14 g. of 1-methyl-5-nitroimidazol - 2 - ylmethyl methylcarbamate; M.P. 99–101° C.

In accordance with the above procedure, but starting with 1-methyl-2-mercaptomethyl - 5 - nitroimidazole, in place of 1-methyl-2-hydroxymethyl - 5 - nitroimidazole, there is obtained the corresponding 1-methyl-5-nitroimidazole, there is obtained the corresponding 1-methyl-5-nitroimidazol-2-ylmethyl thiolcarbamate.

EXAMPLE 10

1-methyl-5-nitroimidazol-2-ylmethyl methylthioncarbamate 0.5 g. of 1-methyl-2-hydroxymethyl-5-nitroimidazole and 0.28 g. of methyl isothiocyanate are added to 20 ml. of benzene containing 0.54 ml. of triethylamine. The resulting mixture is refluxed for 23 hours. It is then concentrated almost to dryness in vacuo and the solid material removed by filtration. This product is 1-methyl-5-nitroimidazol-2 - ylmethyl methylthioncarbamate; M.P. 133.5–135° C. It is recrystallized from water to give substantially pure material; M.P. 135.5–136° C.

In accordance with the above procedure, but starting with 1-methyl - 2 - mercaptomethyl-5-nitroimidazole, in place of 1-methyl - 2 - hydroxymethyl-5-nitroimidazole, there is obtained the corresponding 1-methyl-5-nitroimidazol-2-ylmethyl dithiocarbamate.

EXAMPLE 11

1-n-butyl-5-nitroimidazol-2-ylmethyl carbamate

A mixture of 16.9 g. (0.1 mole) of 1-n-butyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and methyl-5-nitroimidazole.

A solution of 2.0 g. (0.01 mole) of 1-n-butyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. water. The mixture is cooled overnight and the precipitate of 1-n-butyl-5-nitroimidazol-2-ylmethyl phenyl carbonate is separated by filtration.

A solution of 640 mg. (0.002 mole) of 1-n-butyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-n-butyl-5-nitroimidazol-2-ylmethyl carbamate is obtained after evaporating the solvent and washing the residue with water.

In accordance with the above procedure, but starting with 1-methyl-5-nitroimidazole, 1-ethyl-5-nitroimidazole and 1-propyl-5-nitroimidazole, in place of 1-n-butyl-5-nitroimidazole, there is obtained the corresponding 1-methyl-5-nitroimidazol-2-ylmethyl carbamate, 1-ethyl-5-nitroimidazol-2-ylmethyl carbamate, and 1-propyl-5-nitroimidazol-2-ylmethyl carbamate.

EXAMPLE 12

1-(2'-acetoxyethyl)-5-nitroimidazol - 2 - ylmethyl carbamate and 1-(2'-hydroxyethyl)-5-nitroimidazol-ylmethyl carbamate A mixture of 24.25 g. of 1-(2'-acetoxyethyl)-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-acetoxyethyl)-2-hydroxymethyl-5-nitroimidazole; M.P. 138–145° C.

A solution of 1.4 g. of 1-(2'-acetoxyethyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-acetoxyethyl)-5-nitroimidazol-2-ylmethyl phenyl carbonate, M.P. 93–95° C., is separated by filtration.

1.5 g. of 1-(2'-acetoxyethyl)-5-nitroimidazol-2-ylmethyl phenyl carbonate is dissolved slowly in 50 ml. of liquid ammonia. After solution is complete, the ammonia is permitted to evaporate and the residue washed with ethanol and recrystallized to yield 1-(2'-acetoxyethyl)-5-nitroimidazol-2-ylmethyl carbamate; M.P. 160–162° C.

6 g. of 1-(2'-acetoxyethyl)-5-nitroimidazol-2-ylmethyl carbamate is dissolved in 100 ml. of ethanol and the solution saturated with ammonia. The mixture is allowed to stand for 12 hours at 15° C. and the solvent removed by evaporation under reduced pressure. The residue is washed with methanol to yield 1-(2'-hydroxyethyl)-5-nitroimidazol-2-ylmethyl carbamate; M.P. 150–152° C.

EXAMPLE 13

1-(2'-hydroxypropyl)-5-nitroimidazol-2-ylmethyl carbamate

A mixture of 21.3 g. (0.1 mole) of 1-(2'-acetoxypropyl)-5-nitroimidazole, 15 g. (0.5 mole) of paraformaldehyde and 150 ml. of dimethylsulfoxide is heated at 110–150° C. in a sealed tube overnight. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yield 1-(2'-acetoxypropyl)-2-hydroxymethyl-5-nitroimidazole; M.P. 150–155° C.

A solution of 2.43 g. (0.01 mole) of 1-(2'-acetoxypropyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-acetoxypropyl)-5-nitroimidazol-2-ylmethyl phenyl carbonate is separated by filtration.

A solution of 726 mg. (0.002 mole) of 1-(2'-acetoxypropyl)-5-nitroimidazol-2-ylmethyl phenyl carbonate in 10 ml. of chloroform, cooled in an ice-bath, is saturated with dry ammonia. It is allowed to stand for 5 days at 5° C. 1-(2'-acetoxypropyl)-5-nitroimidazol-2-ylmethyl carbamate is obtained crystalline, M.P. 106–108° C., after evaporating the solvent and washing the residue with water.

The 1-(2' - acetoxypropyl)-5-nitroimidazol-2-ylmethyl carbamate produced as above is redissolved in methanol and the solution saturated with anhydrous ammonia. The mixture is allowed to stand for 2 days at 15° C. and concentrated under reduced pressure. The residue is recrystallized from ethyl acetate, ethyl alcohol or a mixture of the two, to yield 1-(2'-hydroxypropyl)-5-nitroimidazol-2-ylmethyl carbamate.

In accordance with the above procedure, but starting with 1-(2'-acetoxybutyl)-5-nitroimidazole, 1-(2'-acetoxypentyl) - 5 - nitroimidazole, 1-(3'-acetoxybutyl)-5-nitroimidazole, 1-(3'-acetoxypentyl) - 5 - nitroimidazole and 1-(3'-acetoxypropyl)-5-nitroimidazole, in place of 1-(2'-acetoxypropyl)-5-nitroimidazole, there is obtained the corresponding 1-(2'-hydroxybutyl) - 5 - nitroimidazol-2-ylmethyl carbamate, 1-(2'-hydroxypentyl)-5-nitroimidazol-2-ylmethyl carbamate, 1-(3'-hydroxybutyl)-5-nitroimidazol - 2 - ylmethyl carbamate, 1-(3'-hydroxypentyl) - nitroimidazol-2-ylmethyl carbamate and 1-(3'-hydroxypropyl)-5-nitroimidazol-2-ylmethyl carbamate, and the corresponding 1-(acetoxyalkyl) - 5 - nitroimidazol-2-ylmethyl carbamate analogs thereof.

In accordance with the above procedure, but using the propionoxy, butyroxy or valeroxy analogs of any of the aforementioned 1-hydroxyalkyl - 5 - nitroimidazoles as starting materials in place of the 1-acetoxyalkyl-5-nitroimidazoles utilized above, there are obtained the corresponding 1-alkanoyloxyalkyl-5-nitroimidazol-2-ylmethyl carbamates and 1-hydroxyalkyl - 5 - nitroimidazol-2-ylmethyl carbamates.

EXAMPLE 14

1-(1'-methyl-5'-nitroimidazol-2'-yl)ethyl carbamate

A solution of 0.01 mole of 1-methyl-2-(1'-hydroxyethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(1'-methyl-5'-nitroimidazol-2'-yl) ethyl phenyl carbonate is separated by filtration.

A solution of 0.005 mole of 1-(1'-methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 1-(1'-methyl - 5' - nitroimidazol-2'-yl) ethyl carbamate, M.P. 156.5–160° C., is obtained as a crystalline precipitate.

EXAMPLE 15

2-(1'-methyl-5'-nitroimidazol-2'-yl)ethyl carbamate

A solution of 0.01 mole of 1-methyl-2'-hydroxyethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 2 - (1' - methyl-5'-nitroimidazol-2'-yl)ethyl phenyl carbonate is separated by filtration.

A solution of 0.005 mole of 2-(1'-methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 2-(1'-methyl-5'-nitroimidazol-2'-yl)ethyl carbamate is obtained as a crystalline precipitate; M.P. 165–166° C.

added and the mixture allowed to stand for 1 hour. The solvent is removed under reduced pressure, and water added to the residue to yield 1-methyl-5-nitroimidazol-2-ylmethyl N-hydroxythioncarbamate; M.P. 94–95° C. (dec.).

In accordance with the above procedure, but starting with N-methylhydroxylamine, N-propylhydroxylamine, N-phenylhydroxylamine, and N-benzylhydroxylamine, in place of hydroxylamine, there is obtained the corresponding 1-methyl-5-nitroimidazol-2-ylmethyl N-methyl-N-hydroxythioncarbamate, 1-methyl-5-nitroimidazol-2-ylmethyl N-propyl-N-hydroxythioncarbamate, and 1-methyl-5-nitroimidazol-2-ylmethyl N'-benzyl-N'-hydroxythioncarbamate.

EXAMPLE 25

1-methyl-5-nitroimidazol-2-ylmethyl N-methoxycarbamate 2 g. of 1-methyl-5-nitroimidazol-2-ylmethyl N-hydroxycarbamate is dissolved in 100 ml. hot methanol. After cooling the solution is treated with an excess of an ether solution of diazomethane. At first, decolorization of the diazomethane is rapid, but later it is very low. After several hours, the colorless solution is filtered from starting material. The residue from the solution is chromatographed over a column of silica gel in ethyl acetate solution. The O-methyl derivative comes directly through the column and is non-crystalline. This material is treated with one equivalent weight of p-toluenesulfonic acid in methyl ethyl ketone to give the p-toluenesulfonic acid salt of 1-methyl-5-nitroimidazol-2-ylmethyl N-methoxy carbamate in 17% overall yield; M.P. 113–115° C.

In accordance with the above procedure, but starting with 1-methyl-5-nitroimidazol-2-ylmethyl N-methyl-N-hydroxycarbamate, 1 - methyl-5-nitroimidazol-2-ylmethyl N-propyl-N-hydroxycarbamate, 1-methyl - 5-nitroimidazol-2-yl methyl N-phenyl-N-hydroxycarbamate, 1-methyl-5-nitroimidazol - 2 - ylmethyl N-benzyl-N-hydroxycarbamate, in place of 1-methyl-5-nitroimidazol-2-ylmethyl N-hydroxycarbamate, there is obtained the corresponding 1-methyl-5-nitroimidazol - 2 - ylmethyl N-methyl-N-methoxycarbamate, 1-methyl - 5 - nitroimidazol-2-ylmethyl N-propyl-N-methoxycarbamate, 1-methyl-5-nitroimidazol-2-ylmethyl N-phenyl-N-methoxycarbamate, 1-methyl-5-nitroimidazol-2-ylmethyl N-benzyl-N-methoxy carbamate.

In accordance with the above procedure, but using diazoethane, diazopropane, diazobutane, and phenyldiazomethane, in place of diazomethane, there is obtained the corresponding 1 - methyl-5-nitroimidazol-2-ylmethyl N-ethoxy carbamate, 1-methyl - 5 - nitroimidazol-2-ylmethyl N-propoxy carbamate, 1-methyl-5-nitroimidazol-2-ylmethyl N-butoxy carbamate, and 1-methyl-5-nitroimidazol-2-ylmethyl N-benzyloxycarbamate.

EXAMPLE 26

1-methyl-5-nitroimidazol-2-ylmethyl acetoxycarbamate

To a solution of 2.22 g. (0.01 mole) of 1-methyl-5-nitroimidazol-2-ylmethyl hydroxycarbamate in 10 ml. of pyridine, cooled in an ice bath, is added slowly 1.12 g. acetic anhydride. The mixture is allowed to warm to room temperature. The solvent is evaporated at reduced pressure leaving a residue which is slurried in ether and filtered giving 1-methyl-5-nitroimidazol-2-ylmethyl acetoxycarbamate.

In accordance with the above procedure, but starting with propionic anhydride, butyric anhydride, valeric anhydride or phenylacetic anhydride, in place of acetic anhydride, there is obtained the corresponding 1-methyl-5-nitroimidazol - 2 - ylmethyl N-propionoxycarbamate, 1-methyl-5-nitroimidazol - 2 - ylmethyl N - butyroxycarbamate, 1-methyl-5-nitroimidazol-2-ylmethyl N-valeroxycarbamate, and 1-methyl-5-nitroimidazol-2-ylmethyl N-phenylacetoxycarbamate.

In accordance with the above procedure, but starting with trifluoroacetic anhydride, in place of acetic anhydride, there is obtained the corresponding 1-methyl-5-nitroimidazol-2-ylmethyl N-trifluoroacetoxycarbamate.

EXAMPLE 27

1-methyl-5-nitroimidazol-2-ylmetyl N-benzoyloxycarbamate 1 g. of 1-methyl-5-nitroimidazol-2-ylmethyl hydroxycarbamate in 15 ml. of 1 N sodium hydroxide is stirred for 2 hours with 0.65 g. of benzoyl chloride. Benzolation is repeated with 0.5 ml. of benzoyl chloride and additional sodium hydroxide. 25 ml. of benzene is added and the benzene layer separated, washed with water and dried over sodium sulfate. Evaporation yields 1-methyl-5-nitroimidazol - 2 - ylmethtyl N-benzoyloxycarbamate; M.P. 147–151° C.

In an analogous manner, but employing 1-methyl-5-nitroimidazole-2-ylmethyl - N - methyl-N-hydroxycarbamate in place of the 1-methyl-5-nitroimidazole-2-ylmethylhydroxycarbamate, the 1-methyl-5-nitroimidazole-2-ylmethyl-N-methyl-N-benzoyloxycarbamate can be prepared.

PREPARATION 1

1-methyl-5-nitroimidazol-2-ylmethyl phenyl carbonate 15.9 ml. dry pyridine and 4.87 g. (0.031 mole) of 1-methyl-2-hydroxymethyl-5-nitroimidazole are added to a flask fitted with a stirrer, thermometer and addition funnel. The mixture is stirred at room temperature until the solid dissolves and then cooled to 0° C. 5.05 g. (0.0322 mole) of phenylchloroformate is added to the stirred solution over an 80 minute period, while maintaining the temperature at 5–10° C. with external cooling. On completion of the addition the reaction mixture is stirred at about 25° C. for 2½ hours. It is then poured into 60 ml. of ice-water with good agitation. The resulting slurry is stirred for 40 minutes and the resulting solid 1-methyl-5-nitroimidazol-2-ylmethyl phenyl carbonate collected by filtration. The solid is washed thoroughly with water and dried in vacuo at 50° C. A yield of 8.24 g. is obtained; M.P. 92–95° C. Recrystallization from 1:3 methanol-hexane gives pure product; M.P. 100–100.5° C.

In accordance with the above procedure, but starting with 1 - methyl - 2 - mercaptomethyl-5-nitroimidazole, in place of 1-methyl-2-hydroxymethyl - 5-nitroimidazole, there is obtained the corresponding 1-methyl-5-nitroimidazol-2-ylmethyl phenyl thiocarbonate.

In accordance with the above procedure, but starting with 1-methyl-2-(1-hydroxyethyl)-5-nitroimidazole, 1-methyl-2-(2-hydroxyethyl)-5-nitroimidazole and 3-(1-methyl-5-nitroimidazol-2-yl)prop-2-en-1-ol in place of 1-methyl-2-hydroxymethyl-5-nitroimidazole, there is obtained the corresponding 1-(1-methyl-5-nitroimidazol-yl)-ethylphenyl carbonate, 2-(1-methyl-5-nitroimidazol-2-yl)-ethylphenyl carbonate, and 3-(1-methyl-5-nitroimidazol-2-yl)prop-2-en-1-yl phenyl carbonate.

PREPARATION 2

1-methyl-5-nitroimidazol-2-ylmethylphenyl thionocarbonate 5.17 g. phenoxythiocarbonyl chloride is added dropwise to a cold solution of 4.71 g. of 1-methyl-2-hydroxymethyl-5-nitroimidazole in 15 ml. of pyridine. During addition the pyridine solution is cooled in an ice bath. After about one-third of the carbonyl chloride is added, 10 ml. of pyridine is added to the reaction mixture. On completion of the addition, the mixture is allowed to warm to room temperature and stirred for three and one-half hours. It is then poured into about an equal volume of an ice-water mixture. A gummy precipitate forms. The water is decanted from this precipitate and the solid triturated with 70 ml. of methanol. Water (70 ml.) is added and the solid product removed by filtra-

EXAMPLE 16

1-methyl-5-nitroimidazol-2-ylmethyl hydroxymethylcarbamate

A mixture of 2.0 g. (0.01 mole) 1-methyl-5-nitroimidazol-2-ylmethylcarbamate, 0.6 g. (0.02 mole) of paraformaldehyde and 6 ml. of dimethyl sulfoxide is heated at 100° C. in a sealed tube for 24 hours. Evaporation of the solvent leaves a viscous residue which is dissolved in 3 ml. of dimethyl formamide. After the addition of 5 ml. of water and standing for 24 hours, a crystalline precipitate is obtained which is separated by filtration, air dried, and recrystallized from ethyl acetate to yield 1 - methyl-5-nitroimidazol-2-ylmethyl N - hydroxymethylcarbamate.

EXAMPLE 17

1-methyl-5-nitroimidazol-2-ylmethyl N-2'-hydroxyethylcarbamate 1.22 g. of ethanolamine is added at 15° C. to a solution of 2.93 g. of 1-methyl-5-nitroimidazol-2-ylmethyl phenylcarbonate in 10 ml. of chloroform. The mixture is stirred for 7 hours and at the end of this time, the solid product is removed by filtration. Recrystallized from ethyl acetate gives 1-methyl-5-nitroimidazol-2-ylmethyl N-2'-hydroxyethyl carbamate; M.P. 132–135° C.

In accordance with the above procedure, but starting with propanolamine, butanolamine, in place of ethanolamine, there is obtained the corresponding 1-methyl-5-nitroimidazol-2-ylmethyl N - 3'-hydroxypropylcarbamate, and 1-methyl-5-nitroimidazol-2-ylmethyl N-hydroxybutylcarbamate.

EXAMPLE 18

1-methyl-5-nitroimidazol-2-ylmethyl ethoxymethylcarbamate

A mixture of 1.15 g. (.005 mole) of 1-methyl-5-nitroimidazol-2-ylmethyl hydroxymethylcarbamate, .05 g. of p-toluenesulfonic acid and 20 ml. of ethanol is allowed to stir overnight at room temperature. After evaporation, the residue is dissolved in 50 ml. of chloroform and the chloroform solution washed with dilute sodium bicarbonate solution. The chloroform solution, after drying over sodium sulfate, is evaporated to dryness. The residue is recrystallized from ethyl acetate to yield 1-methyl-5-nitroimidazol-2-ylmethyl N-ethoxymethylcarbamate.

In accordance with the above procedure, but using n-propanol, n-butanol or n-pentanol in place of ethanol,

EXAMPLE 19

1-methyl-5-nitroimidazol-2-ylmethyl N-ethoxyethylcarbamate 1.78 g. (0.02 mole) of 2-ethoxyethylamine is added at 15° C. to a solution of 2.93 g. of 1-methyl-5-nitroimidazol-2-ylmethyl phenylcarbonate in 10 ml. of chloroform. The mixture is stirred for 7 hours and at the end of this time, the solution is evaporated to dryness. The residue is slurried with water and the solid product after filtration, is recrystallized from ethanol-water to give 1-methyl-5-nitroimidazol-2-ylmethyl N-ethoxyethylcarbamate.

In accordance with the above procedure, but starting with 3-ethoxypropylamine, 4-ethoxybutylamine, 5-ethoxypentylamine, and 6-ethoxyhexylamine, in place of 2-ethoxyethylamine, there is obtained the corresponding 1-methyl-5-nitroimidazol-2-ylmethyl N - 3 - ethoxypropylcarbamate, 1-methyl-5-nitroimidazol-2-ylmethyl N-4-ethoxybutylcarbamate, 1-methyl-5-nitroimidazol-2-ylmethyl N - 5 - ethoxypentylcarbamate, and 1-methyl-5-nitroimidazol-2-ylmethyl N-6-ethoxyhexylcarbamate.

EXAMPLE 20

1-methyl-5-nitroimidazol-2-ylmethyl N-mercaptoethylcarbamate 1.54 g. (0.02 mole) of 2-mercaptoethylamine is added at 15° C. to a solution of 2.77 g. of 1-methyl-5-nitroimidazol-2-ylmethyl phenylcarbonate in 10 ml. of chloroform. The mixture is stirred for 7 hours and at the end of this time, the solid product is removed by filtration. Recrystallization from ethanol gives 1-methyl-5-nitroimidazol-2-ylmethyl N-2'-mercaptoethylcarbamate.

EXAMPLE 21

1-methyl-5-nitroimidazol-2-ylmethyl N-ethylthioethylcarbamate 2.12 g. (0.02 mole) of ethylthioethylamine is added at 15° C. to a solution of 2.77 g. of 1-methyl-5-nitroimidazol-2-ylmethyl phenylcarbonate in 10 ml. of chloroform. The mixture is stirred for 7 hours and then evaporated to dryness. The residue is triturated with ether and the solid product is removed by filtration. Recrystallization from ethanol gives 1-methyl-5-nitroimidazol-2-ylmethyl N-2'-ethylthioethylacarbamate.

In accordance with the above procedure, but starting with 2 - methylthioethylamine, 2 - propylthioethylamine, 2-butylthioethylamine, or 2-benzylthioethylamine, in place of 2-ethylthioethylamine, there is obtained the corresponding 1-methyl-5-nitroimidazol-2-ylmethyl N-2'-methylthioethylcarbamate, 1 - methyl - 5 - nitroimidazol-2-ylmethyl N-2'-propylthioethylcarbamate, 1-methyl-5-nitroimidazol-2-ylmethyl N-2'-butylthioethylcarbamate, and 1-methyl-5-nitroimidazol-2-ylmethyl N-2'-benzylthioethylcarbamate.

EXAMPLE 22

1-methyl-5-nitroimidazol-2-ylmethyl N-hydroxycarbamate 0.386 g. of sodium is dissolved in 40 ml. of methanol and the solution cooled in an ice bath. 1.17 g. of hydroxylamine hydrochloride is added to the cold methanol solution. To the resulting mixture there is added over a period of 45 minutes 2.33 g. of 1-methyl-5-nitroimidazol-2-ylmethyl phenyl carbonate in 60 ml. of methanol. The resulting mixture is held for 15 hours at refrigerator temperature and at the end of this time, the solid material present is removed by filtration. The solid is washed with alcohol and then with hexane, and dried to give 1-methyl-5-nitroimidazol-2-ylmethyl N-hydroxycarbamate; M.P. 189–190° C.

In accordance with the above procedure, but starting with N-methylhydroxylamine hydrochloride, N-propyl hydroxylamine hydrochloride, N-phenylhydroxylamine hydrochloride, and N-benzylhydroxylamine hydrochloride, in place of hydroxylamine, there is obtained the corresponding 1-methyl-5-nitroimidazol-2-ylmethyl N-methyl-N-hydroxycarbamate, 1 - methyl-5-nitroimidazol-2-ylmethyl N-propyl-N-hydroxycarbamate, 1-methyl-5-nitroimidazol-2-ylmethyl N-phenyl-N-hydroxycarbamate, and 1-methyl-5-nitroimidazol - 2 - ylmethyl N-benzyl-N-hydroxycarbamate.

EXAMPLE 23

1-(2'-acetoxyethyl)-5-nitroimidazol-2-ylmethyl N-hydroxy carbamate 3.66 g. of 1-(2'-acetoxyethyl)-5-nitroimidazol-2-ylmethyl phenyl carbonate is dissolved in 20 ml. of methanol and treated with freshly prepared hydroxylamine from .72 g. of hydroxylamine hydrochloride and .6 g. of sodium methoxide in 20 ml. of methanol. The residue is recrystallized from ethanol to yield 1-(2'-acetoxyethyl)-5-nitroimidazol-2-ylmethyl N-hydroxycarbamate; M.P. 153–155° C.

EXAMPLE 24

1-methyl-5-nitroimidazol-2-ylmethyl N-hydroxythioncarbamate 0.56 g. (0.005 mole) of potassium t-butoxide is dissolved in 20 ml. of ethanol and 0.35 g. (0.005 mole) of hydroxylamine hydrochloride is added and the mixture stirred for 5 minutes. 0.732 g. (0.0025 mole) of 1-methyl-5-nitroimidazol-2-ylmethyl phenyl thioncarbonate is tion. It is recrystallized from benzene-hexane to give 1-methyl-5 - nitroimidazol-2-ylmethyl phenyl thionocarbonate; M.P. 92–98° C. On further recrystallization from benzene-hexane the product melts at 103–105.5° C.

In accordance with the above procedure, but starting with 1-methyl-2-mercaptomethyl-5-nitroimidazole in place of 1-methyl-2-hydroxymethyl - 5-nitroimidazole, there is obtained the corresponding 1-methyl-5-nitroimidazol-2-ylmethyl phenyl dithiocarbonate.

What is claimed is:

1. A compound having the formula:

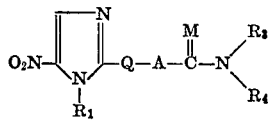

wherein $R_1$ is loweralkyl of 1–5 carbon atoms, Q is loweralkylene or loweralkylidene of 1–4 carbon atoms, A and M are each oxygen or sulfur, $R_3$ is hydrogen or loweralkyl of 1–3 carbon atoms, and $R_4$ is loweralkoxy of 1–5 carbon atoms, loweralkanoyloxy of 1–5 carbon atoms, or benzoyloxy.

2. A compound of claim 1 in which $R_1$ is methyl.
3. A compound of claim 2 in which Q is methylene.
4. A compound of claim 3 in which both A and M are oxygen.
5. A compound of claim 4 in which $R_3$ is hydrogen.
6. The compound of claim 5 in which $R_4$ is methoxy.
7. The compound of claim 5 in which $R_4$ is benzoyloxy.
8. The compound of claim 5 in which $R_4$ is acetoxy.

References Cited

UNITED STATES PATENTS

| 3,299,090 | 1/1967 | Hoff et al. | 260—309 |
| 3,325,507 | 6/1967 | Kollonitsch | 260—309 |
| 3,378,552 | 4/1968 | Henry | 260—309 |

FOREIGN PATENTS

| 683,796 | 1/1967 | Belgium | 260—309 |

NATALIE TROUSOF, Primary Examiner